United States Patent [19]

Chamblin, Sr. et al.

[11] Patent Number: 5,142,908
[45] Date of Patent: Sep. 1, 1992

[54] MOUNTING ASSEMBLY FOR FUEL LEVEL SENSOR

[75] Inventors: Robert O. Chamblin, Sr.; James A. Huenefeld, both of Chillicothe; Randal E. Hulva, East Peoria; John R. Menk, Delavan, all of Ill.

[73] Assignee: Caterpillar Inc., Peoria, Ill.

[21] Appl. No.: 700,384

[22] Filed: May 3, 1991

[51] Int. Cl.⁵ .............................................. G01F 23/24
[52] U.S. Cl. .......................................... 73/319; 73/320
[58] Field of Search ........................... 73/317, 319, 321

[56] References Cited

U.S. PATENT DOCUMENTS

| | | | |
|---|---|---|---|
| 509,170 | 11/1893 | Johnson | 73/319 |
| 1,633,322 | 6/1927 | Gregory | 73/320 |
| 2,533,490 | 12/1950 | McGrath et al. | 73/325 |
| 3,654,891 | 4/1972 | Aas et al. | 73/320 X |
| 4,155,254 | 5/1979 | Colditz | 73/447 |
| 4,342,224 | 8/1982 | Hara et al. | 73/319 X |
| 4,610,165 | 9/1986 | Duffy et al. | 73/317 |

Primary Examiner—Daniel M. Yasich
Attorney, Agent, or Firm—Claude F. White

[57] ABSTRACT

An assembly for mounting a fuel level sensing apparatus within a fuel tank of a vehicle includes a base member, a head member, and an elongated tubular member welded at one end to the base member and welded at the other end to the head member. The mounting assembly is positioned within a fuel tank and the head member is welded to a wall portion of the fuel tank. A fuel level sensing apparatus, having a guide portion and a mounting portion, is positioned within the mounting assembly, with the guide portion within the confines of the base member and the mounting portion releasably secured to the head member. A groove in the wall of the guide portion accommodates a rubber cushioning ring which is slightly compressed between the base member and the guide portion groove. Vehicle shocks and vibrations which would normally be transmitted to the fuel level sensing apparatus are dampened by the rubber cushioning ring.

9 Claims, 2 Drawing Sheets

MOUNTING ASSEMBLY FOR FUEL LEVEL SENSOR

DESCRIPTION

1. Technical Field

This invention relates generally to an assembly for mounting a fuel level sensing apparatus within the fuel tank of a work vehicle and more particularly to an assembly having a resilient cushioning ring for dampening shocks and vibrations which can damage the sensing apparatus.

2. Background Art

Large work vehicles, such as earthmoving and construction tractors, are generally equipped with a dipstick-type gage to indicate the level of fuel in the vehicle fuel tank. To read this type of gage, the vehicle must be stopped and the operator, or service personnel, must climb onto the vehicle and remove the gage. After taking the reading, the operator must re-insert the gage into the fuel tank, securely fasten it, and then climb off of the vehicle. This task is inconvenient and time consuming, but must be done to prevent the vehicle from running out of fuel.

Conventional fuel sensing gages and mountings have proved inadequate for use on large construction and earthmoving vehicles because of severe shocks and vibrations experienced by the vehicle during work operations. Such shocks and vibrations damage or destroy conventional fuel sensing gages and mountings.

The present invention is directed to overcoming one or more of the problems as set forth above.

DISCLOSURE OF THE INVENTION

In one aspect of the present invention, an assembly for mounting a fuel level sensing apparatus within a fuel tank of a vehicle includes a tubular member, a base member, and a head member. The tubular member has first and second end portions, with the first end portion being joined to the base member and the second end portion being joined to the head member. A fuel level sensing apparatus is positioned within the tubular member, the head member, and the base member, and a resilient ring is positioned between the base member and the fuel level sensing apparatus.

Conventional types of fuel level sensing apparatus and mountings suffer damage due to shock loading and vibrations when used on large size earthmoving and construction vehicles. In view of these problems, such vehicles generally utilize a manually manipulated dipstick-type fuel gage. Checking the fuel level with the dipstick-type gage is time consuming, inconvenient, and often unpleasant in inclement weather.

The subject mounting assembly utilizes a premachined housing for mounting a fuel level sensing apparatus in a fuel tank of an earthmoving vehicle. Pre-machining provides close tolerances for proper operation of the fuel level sensing apparatus. A resilient ring positioned between the mounting assembly and the fuel level sensing apparatus provides radial support and cushions the shock loads and vibrations.

BEST MODE FOR CARRYING OUT THE INVENTION

Figure 1:
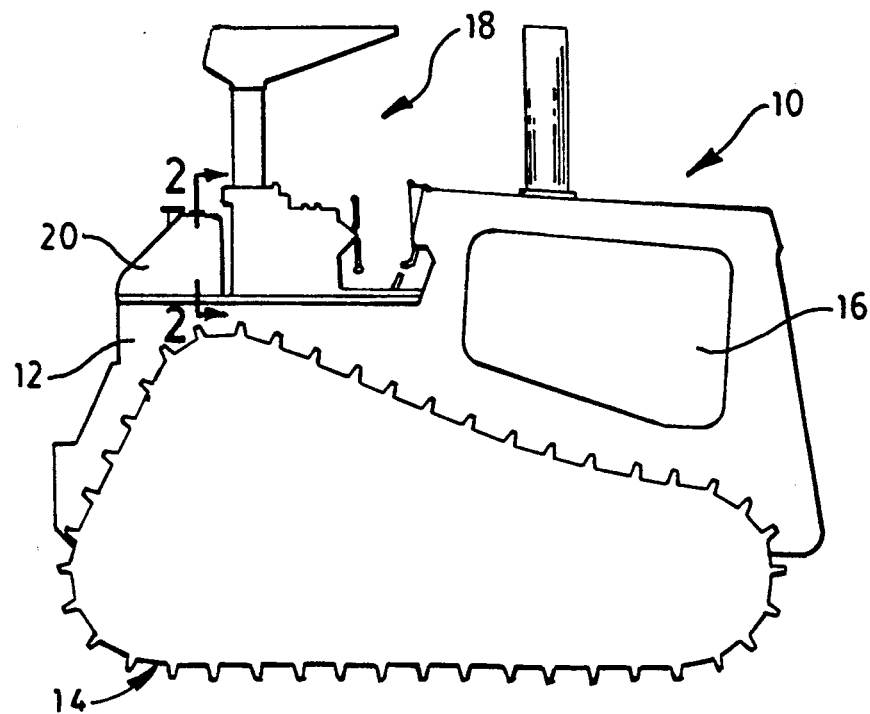
FIG. 1 is a diagrammatic side elevational view of a track-type vehicle which incorporates the fuel level sensor mounting assembly of the present invention.
Figure 3:
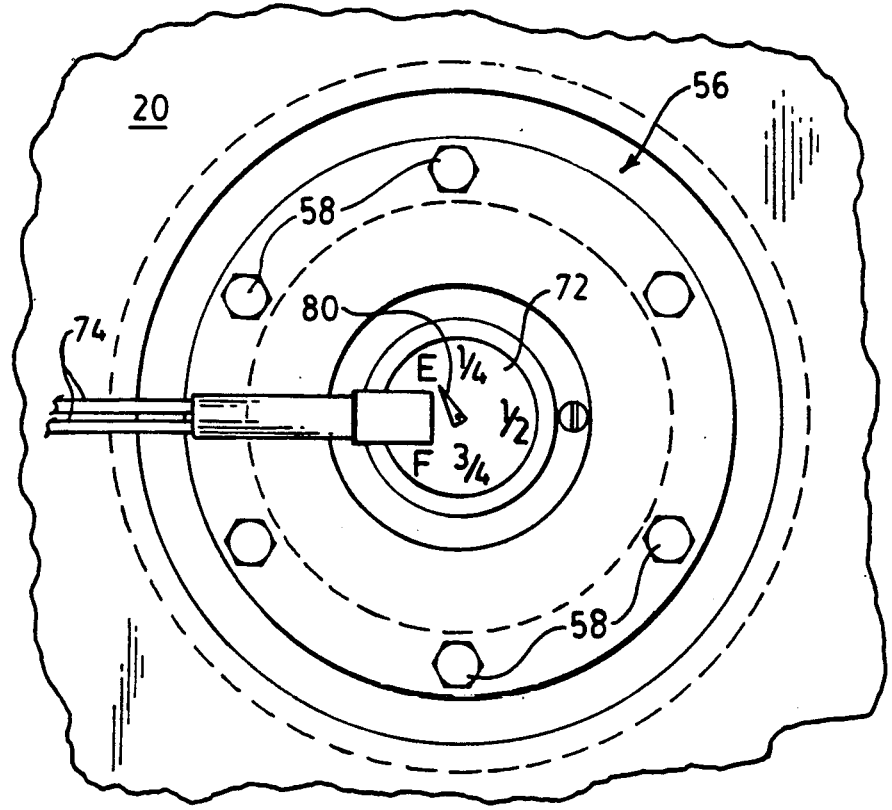
FIG. 3 is a diagrammatic plan view taken generally along the lines 3—3 of FIG. 2.

Referring to the drawings, a track-type vehicle 10 includes a frame 12, a track assembly 14, an engine 16, and an operator's compartment 18. A fuel tank 20 is supported on the frame 12 and is positioned at the rear of the vehicle 10 and behind the operator's compartment 18.

Figure 2:
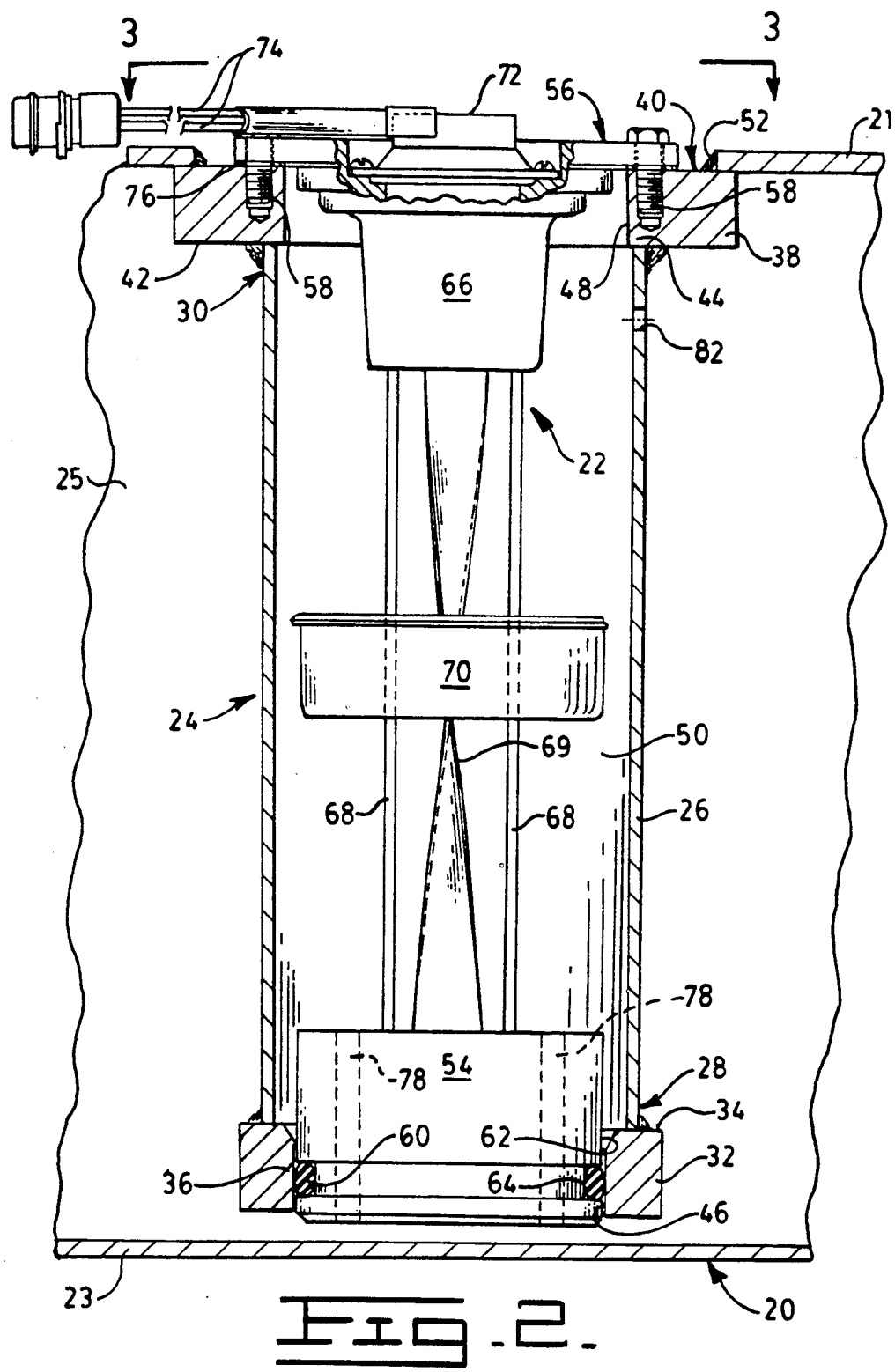
FIG. 2 is a diagrammatic sectional view through the fuel tank of the vehicle shown in FIG. 1; taken generally along the lines 2—2 of FIG. 1.

With particular reference to FIG. 2, the fuel tank 20 has first and second wall portions 21,23 which define a first tank chamber 25. A fuel level sensing apparatus 22 is mounted within the fuel tank 20 by means of a mounting assembly 24 which is positioned within the first chamber 25. The mounting assembly 24 includes a tubular member 26 having first and second end portions 28,30, a base member 32 having a surface portion 34 and a wall portion 36, and a head member 38 having first and second surface portions 40,42 and a wall portion 44. The wall portion 36 of the base member 32 defines a first internal through bore 46, and the wall portion 44 of the head member defines a second internal bore 48. The first end portion 28 of the tubular member 26 is joined, as by welding, to the surface portion 34 of the base member 32, and the second end portion 30 of the tubular member 26 is joined, as by welding, to the second surface portion 42 of the head member 38. The first surface portion 40 of the head member 38 is joined, as by welding, to the first wall portion 21 of the fuel tank 20. The tubular member 26, the base member 32, and the head member 38 are joined together to define a second sensing chamber 50. The first wall portion 21 of the fuel tank 20 defines an opening 52 into the first chamber 25 and the mounting assembly 24 is positioned under the opening 52.

The fuel level sensing apparatus 22 is adapted to be positioned within the second chamber 50. The sensing apparatus 22 includes a guide portion 54 and a mounting portion 56, with the mounting portion 56 being releasably joined to the head member first surface portion 40 by a plurality of threaded fasteners 58. A resilient rubber cushioning ring 60 is positioned between the first internal bore 46 and the guide portion 54 of the sensing apparatus 22. The guide portion 54 has a circumferential surface 62 and a U-shaped circumferential groove 64 is formed in the surface 62. The rubber cushioning ring 60 is adapted to be positioned within the groove 64, and the guide portion 54 is adapted to be positioned within the base member internal bore 46. The rubber cushioning ring 60 is therefore positioned between the guide portion 54 and the internal through bore 46, and is slightly compressed during assembly of the sensing apparatus 22 within the mounting assembly 24.

The fuel level sensing apparatus 22 is substantially a commercially available assembly, such as those supplied by Rochester Gauges, Inc., of Dallas, Tex. The apparatus 22 includes an electrical sensing portion 66, a pair of guide shafts 68 extending between the sensing portion 66 and the guide portion 54, a spindle bar 69, and a float 70. The spindle bar 69 is formed from a rectangular piece of metal and has been twisted into a helix. The lower portion of the bar 69 is pivotally mounted in the guide portion 54 and the upper portion of the bar 69 is pivotally mounted in the sensing portion 66. The shafts 68 guide the float 70 as it moves up and down within the chamber 50. The sensing portion 66 includes a sight gauge 72 and electrical connectors 74, which connect with a visual fuel gauge (not shown) in the operator's compartment 18. A gasket 76 is positioned between the head member 38 and the mounting portion 56 to seal the first and second chambers 25,50. A plurality of openings 78 extend through the guide portion 54 to connect the first chamber 25 to the second chamber 50 and allow fuel to flow from the tank chamber 25 into the sensing chamber 50. Fuel entering into the sensing chamber 50 raises the float 70, which turns the spindle bar 69 which is connected to an indicator 80 on the sight gauge 72 and sends a signal to the fuel gauge in the operator's compartment. A vent hole 82 in the tubular member 26 allows trapped air to escape from the second chamber 50.

Industrial Applicability

With reference to the drawings, the subject mounting assembly 24 is particularly useful for mounting a fuel level sensing apparatus 22 within a fuel tank 20 of a work vehicle, such as a track-type tractor 10. The mounting assembly 24 is formed of a base member 32, a head member 38, and a tubular member 26 which extends between the base and head members 32,38. These various parts are joined together by welding and then machined to form the assembly 24, which is then welded within the fuel tank 20. This eliminates a gasket between the head member 38 and the first wall portion 21 of the tank 20, such gaskets being necessary in support assemblies which are bolted to the fuel tank. Welding of the support assembly 24 to the fuel tank 20 also provides a smaller head member 38 of the support assembly 24.

With the support assembly 24 positioned within a fuel tank 20 and securely welded to the tank 20, a fuel level sensing apparatus 22 is inserted into the chamber 50 with the guide portion 54 seated within the bore 46 of the base member 32 and the mounting portion 56 in contact with the head member 38. Threaded fasteners 58 are then used to secure the mounting portion 56 to the head member 38. The cushioning ring 60, which is positioned within the groove 64, is compressed slightly as the mounting portion 54 is positioned within the base member 32, thereby providing radial support for the sensing apparatus 22. The cushioning ring 60 can be replaced by removing the fasteners 58 and removing the fuel level sensing apparatus 22 from the mounting assembly 24.

With the sensing apparatus 22 in place within the mounting assembly 24, fuel within the tank 20 flows through openings 78 and raises the float 70. As the float raises, it rotates the spindle bar 69 which is connected to the fuel indicator 80 which indicates the fuel level in the sight gauge 72. An electrical signal is also sent to a fuel gauge within the operator's compartment 18. During operation of the vehicle 10, the mounting assembly 24 supports and cushions the fuel level sensing apparatus against high vibration and high impact loads.

Other aspects, objects and advantages of this invention can be obtained from a study of the drawings, the disclosure, and the appended claims.

We claim:

1. An assembly for mounting a fuel level sensing apparatus with a fuel tank of a vehicle, comprising:

a tubular member having first and second end portions;

a base member having a surface portion and a wall portion defining an internal bore, said first end portion of said tubular member being joined to said base member surface portion;

a head member having first and second surface portions and a wall portion defining an internal bore, said first surface portion being joined to said fuel tank and said second surface portion being joined to said tubular member second end portion;

said fuel level sensing apparatus being positioned within said tubular member, said base member internal bore, and said head member internal bore;

a resilient cushioning ring positioned between said base member internal bore and said fuel level sensing apparatus; and said sensing apparatus including a mounting portion and a guide portion, said mounting portion being adapted to be releasably joined to said head member, and said guide portion including a circumferential groove, said cushioning ring being positioned substantially within said groove, and said guide portion being adapted to be positioned within said base member internal bore.

2. An assembly, as set forth in claim 1, wherein said second end portion of said tubular member is joined to said head member second surface portion by welding.

3. An assembly, as set forth in claim 1, wherein said resilient cushioning ring is comprised of rubber.

4. An assembly, as set forth in claim 1, wherein said head member is joined at said first surface portion to said fuel tank by welding.

5. An assembly, as set forth in claim 1, wherein said first end portion of said tubular member is joined to said base member surface portion by welding.

6. An assembly for mounting a fuel level sensing apparatus, comprising:

a fuel tank having first and second wall portions defining a first chamber, said first wall portion defining an opening into said chamber;

a mounting assembly positioned within said first chamber and including a tubular member, a base member, and a head member, said tubular member, said base member and said head member being joined together to define a second chamber;

a fuel level sensing apparatus positioned within said second chamber and including a guide portion and a mounting portion, said mounting portion being adapted to be releasably joined to said mounting assembly head member;

a rubber cushioning ring positioned between said base member and said guide portion; and said head member includes first and second surface portions, said head member being welded to said fuel tank at said first surface portion and welded to said tubular member at said second surface portion.

7. An assembly for mounting a fuel level sensing apparatus, comprising:

a fuel tank having first and second wall portions defining a first chamber, said first wall portion defining an opening into said chamber;

a mounting assembly positioned within said first chamber and including a tubular member, a base member, and a head member, said tubular member, said base member and said head member being joined together to define a second chamber;

a fuel level sensing apparatus positioned within said second chamber and including a guide portion and a mounting portion, said mounting portion being adapted to be releasably joined to said mounting assembly head member;

a rubber cushioning ring positioned between said base member and said guide portion; and said base member includes a wall portion defining an internal through bore, said guide portion being positioned within said through bore, and said rubber cushioning ring being positioned between said guide portion and said internal through bore.

8. An assembly for mounting a fuel level sensing apparatus, comprising:

a fuel tank having first and second wall portions defining a first chamber, said first wall portion defining an opening into said chamber;

a mounting assembly positioned within said first chamber and including a tubular member, a base member, and a head member, said tubular member, said base member and said head member being joined together to define a second chamber;

a fuel level sensing apparatus positioned within said second chamber and including a guide portion and a mounting portion, said mounting portion being adapted to be releasably joined to said mounting assembly head member;

a rubber cushioning ring positioned between said base member and said guide portion; and said guide portion including a circumferential surface and a U-shaped groove formed in said surface, said rubber cushioning ring being positioned substantially with said groove.

9. An assembly, as set forth in claim 8, wherein said tubular member has first and second end portions, said first end portion being welded to said base member and said second end portion being welded to said head member.

* * * * *